(No Model.) 5 Sheets—Sheet 1.

F. SIEMENS.
Manufacture of Glass.

No. 242,845. Patented June 14, 1881.

Witnesses:
F. M. Burnham
Daniel Breed

Inventor:
Frederick Siemens
by C. S. Whitman
attorney (No Model.)  5 Sheets—Sheet 4.

F. SIEMENS.
Manufacture of Glass.

No. 242,845.  Patented June 14, 1881.

Witnesses:  
F. M. Burnham  
Daniel Breed

Inventor:  
Frederick Siemens  
by C. S. Whitman  
attorney

N. PETERS, Photo-Lithographer, Washington, D. C.

(No Model.) 5 Sheets—Sheet 5.
F. SIEMENS.
Manufacture of Glass.
No. 242,845. Patented June 14, 1881.
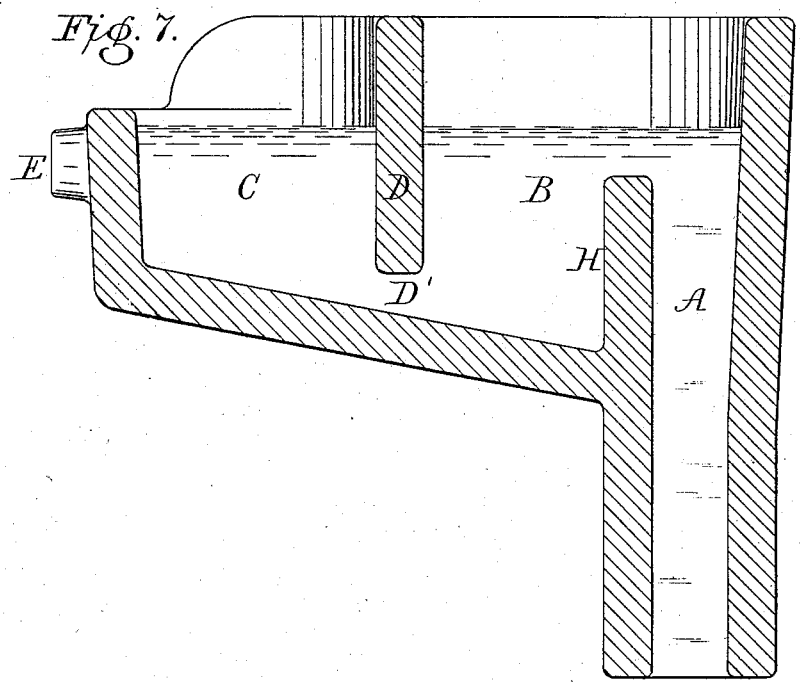
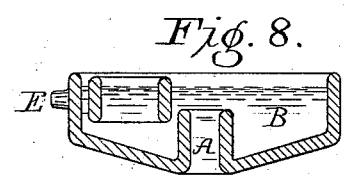
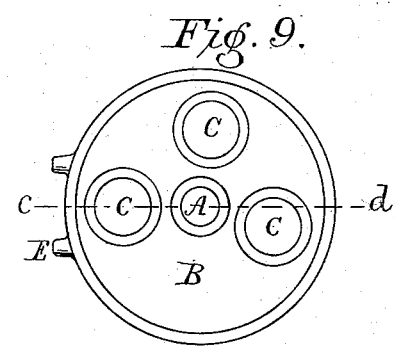
Witnesses:
F. M. Burnham
Daniel Breed
Inventor:
Fredrick Siemens
by C. S. Whitman
attorney

UNITED STATES PATENT OFFICE.

FREDERICK SIEMENS, OF DRESDEN, GERMANY, ASSIGNOR TO CHARLES WILLIAM SIEMENS, OF WESTMINSTER, ENGLAND.

MANUFACTURE OF GLASS.

SPECIFICATION forming part of Letters Patent No. 242,845, dated June 14, 1881.

Application filed April 6, 1881. (No model.) Patented in Germany July 3, 1877, and in England November 22, 1879.

*To all whom it may concern:*

Be it known that I, FREDERICK SIEMENS, of Dresden, in the German Empire, have invented certain Improvements in the Manufacture of Glass, (for which the following patents have been obtained: in Germany, Patent No. 6,161, filed 28th December, 1878, as a patent of addition to Patent No. 925, dated 3d July, 1877, and expiring 13th December, 1891; in England, Patent No. 4,763, dated 22d November, 1879,) of which the following is a specification.

My invention relates to the art of continuously melting, fining, and working out glass in tank-furnaces; and the nature thereof consists in effecting the melting down of the materials, the clarifying and cooling of the melted glass, and the working out of the cooled glass continuously by means of a floating vessel having three compartments, as hereinafter described.

It also consists in providing a floating vessel for continuously melting, fining, and working out glass with an upwardly-projecting transverse partition, whereby the melted glass within the fining-compartment of the floating vessel is prevented from flowing back into the tank.

It also consists in providing a refining-vessel, floating within the metal of a tank-furnace, with studs or horns forming a fender or fenders to keep the vessel away from the wall, also to prevent fused material from the roof or gathering-holes falling therein.

Figure 1:
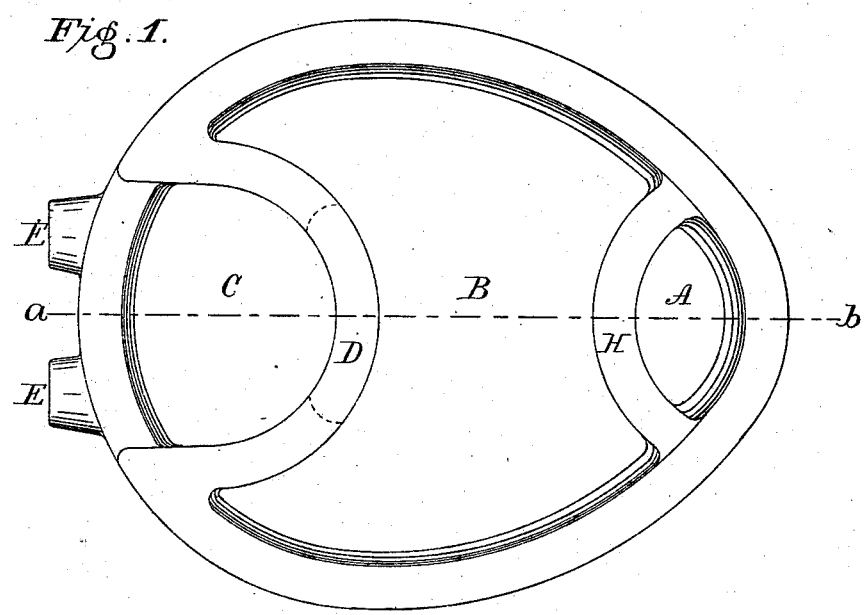
Figure 2:
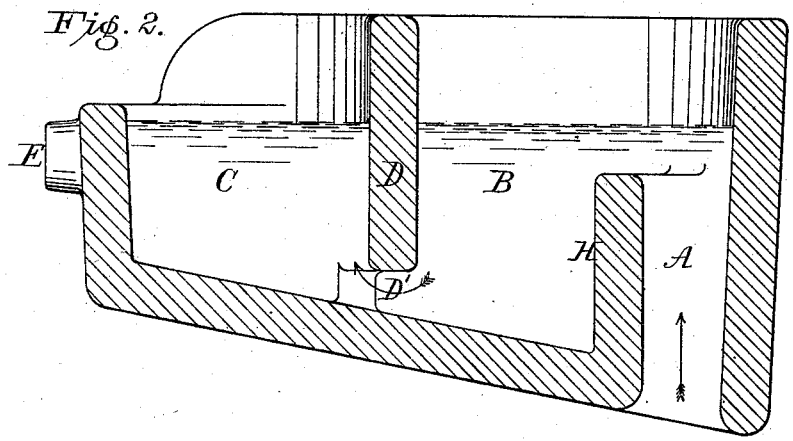
Figure 3:
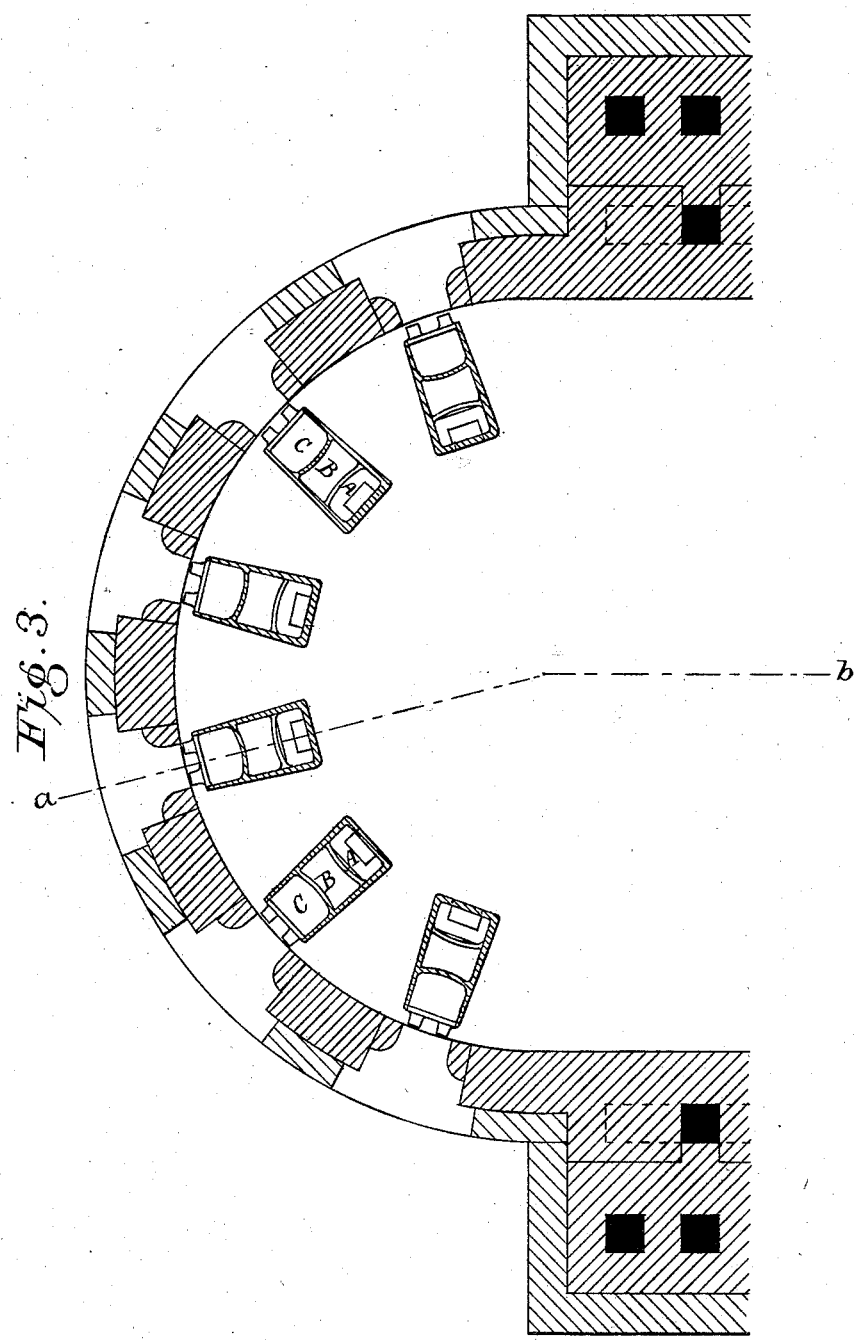
Figure 4:
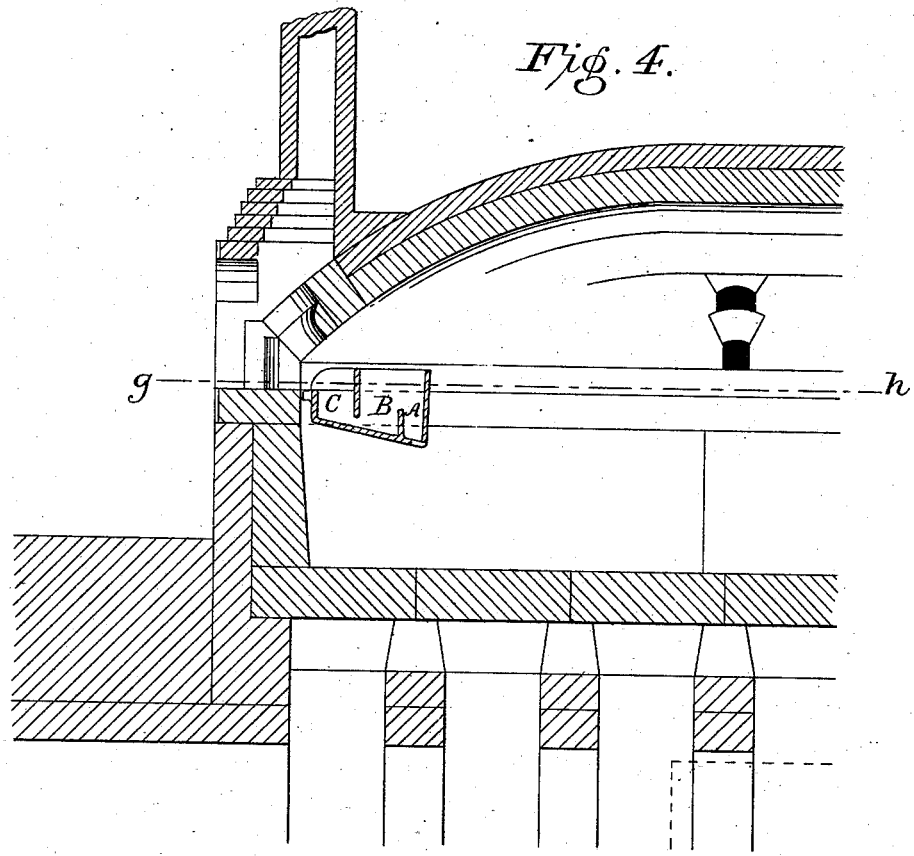
Figure 5:
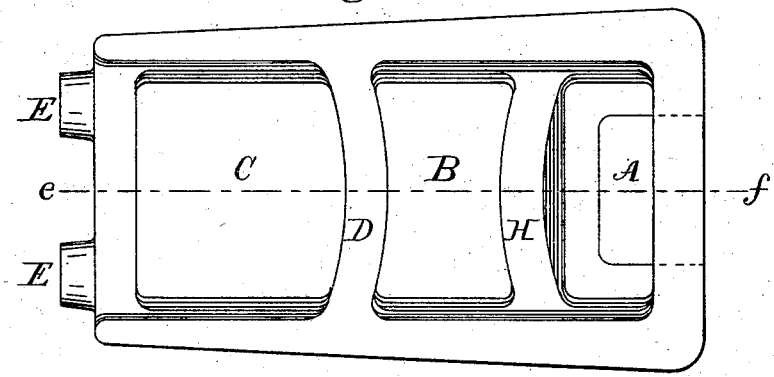
Figure 6:
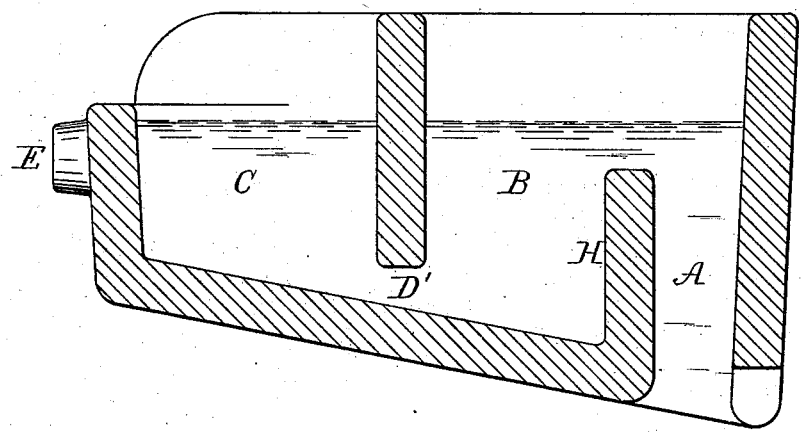

In the accompanying plate of drawings, in which corresponding parts are designated by the same letters, Figure 1 is a plan of a refining floating vessel. Fig. 2 is a longitudinal vertical section taken on the line *a b* of Fig. 1. Fig. 3 is a plan, in horizontal section, on the line *g h*, Fig. 4, of the tank of a glass-furnace, showing the refining-vessels floating on the metal. Fig. 4 is a vertical section of the same, taken on the line *a b* of Fig. 3.

The floating vessel made use of in my process of continuously melting, fining, and working out glass is constructed of fire-clay or other suitable material, and may be of any size or shape, several being shown at Figs. 5, 6, 7, 8, and 9 which may be deemed desirable or best adapted to the work for which it is used. It is provided with three communicating compartments or receptacles arranged in relation to each other, as shown in the drawings. The first of these compartments, A, is a receiver, into which the metal flows from the tank. The second, B, is a refining-chamber, and the third, C, is a working-out compartment. The refining-vessel is made to float in the metal of the tank in such a manner that the first compartment is supplied through holes at or near its bottom with glass taken at the lowest practicable depth below the surface of the material in the tank—that is to say, at the point at which the metal is sufficiently liquid to flow into it, the hottest metal being at the upper surface, over which the flame plays, and gradually diminishing in temperature toward the bottom. The vessel may be adjusted to the desired level at its supply-end by a greater or less thickness of those parts which project above the metal, or by means of loose bricks placed upon the vessel.

The receiver or first compartment, into which the metal flows from the tank, is separated from the refining-chamber or second compartment, B, by a partition or dam, H, rising from the bottom of the floating vessel, and the base thereof is provided with one or more apertures, openings, or spouts of any size or shape which may be deemed desirable for the admission of the metal, the use of spouts enabling the metal to be drawn from another point in the tank than that in contact with the floating vessel. By the observation of well-known laws and methods for regulating the position of floating bodies the vessel may be so constructed and floated that this opening in the bottom of the first compartment will occupy the most desirable location for withdrawing the best material from the tank, or the vessel may be weighted, if necessary, as already described, so as to be adjusted to this point.

The working-out compartment, C, is separated from the refining-chamber by the cross-partition D, having an opening, D', at the bottom thereof for the passage of the refined glass from the compartment B. The object of the partition H is to prevent the refined glass within the floating vessel from finding its way back into the tank, and thus, in conjunction with the partition D, cause the working-out compartment to be supplied only with the most refined glass from the refining-chamber. The size of the latter will depend upon the kind of glass to be worked out. Thus, when window-glass or large objects requiring the withdrawal of great quantities of glass at a time are to be produced, the refining-compartment may be of greater capacity than when bottle-glass is required, or two or more vessels may be employed from which glass may be gathered successively.

The refining-compartment should be subjected to the full heat of the furnace, if all the glass which reaches it is to be thoroughly refined therein; otherwise the metal therein may be skimmed from time to time for the removal of imperfectly-fused glass.

The working-out compartment C is sometimes provided with a hood, in order that the refined glass may be sufficiently cooled therein for gathering, and that the workmen may be protected from the direct action of the flame while gathering the glass.

The working-out end of the floating vessel is provided with studs or horns E at or near the upper edge, serving as fenders to keep the said vessel from contact with the side of the tank, to which it might otherwise adhere, owing to the cooling of the material next the side of the tank, and thus also preventing fused material from the roof or sides falling into it. With the assistance of these fenders no difficulty is experienced in keeping the floating vessels in position in the tank, as the flow of the glass causes them to press slightly against the sides of the tank nearest their respective working-out holes. Advantage is taken of the gradually increasing specific gravity of the glass during the process of melting and fining, in order to produce the required circulation of the melted glass through the compartments of the floating vessel. By means of the passage A in the bottom of the vessel the best material in the tank, free from floating impurities, is admitted into the first compartment, through which it rises until it flows over the top of the partition or dam H into the refining-chamber B, wherein a stratification of the metal takes place, the most perfectly clarified and dense portion of the glass sinking to the bottom of the compartment and forcing the lower stratum therein through the passage D' into the working-out compartment C, the refined metal being prevented from flowing back into the tank by the cross-partition or dam H.

By the use of floating vessels, as thus described, the melting down of the materials, the clarifying the cooling of the melted glass, and the working out of the glass may be effected continuously, while maintaining the furnace-heat at a uniform temperature, without the use of division-walls in the tank.

Vessels, as above described, may be also used in pots, and such pots may be worked as tanks with the hottest flame playing continuously over the surface of the material contained in them.

Having thus described my invention, I claim and desire to secure by Letters Patent of the United States—

1. The improvement in the art of continuously melting, fining, and working out glass by floating a vessel in the tank of a furnace, or in a pot into which the melted glass is caused to flow from the lowest practicable level.

2. The improvement in the art of continuously melting, fining, and working out glass by floating a vessel in the tank of a furnace, or in a pot into which the melted glass is caused to flow upward into a first compartment, thence downward into a second or fining compartment, and finally upward from the bottom of the fining-compartment to a third or working-out compartment, as and for the purposes described.

3. In a floating vessel for continuously fining and working out glass, an upwardly-projecting transverse partition, whereby the melted glass within the fining-compartment is prevented from flowing back, as and for the purposes described.

4. A floating vessel for continuously fining and working out glass, having a compartment for receiving and directing the upward flow of the glass therein, a compartment for holding and fining the glass, and a compartment for working out the glass, as and for the purposes described.

5. A floating boat provided at or near its upper edge with projections, as and for the purposes described.

In testimony that I claim the foregoing I have hereunto set my hand and seal.

FREDERICK SIEMENS. [L. S.]

Witnesses:
LÉON KLEMPERER,
PAUL DRUCKMÜLLER.